Patented Dec. 27, 1949

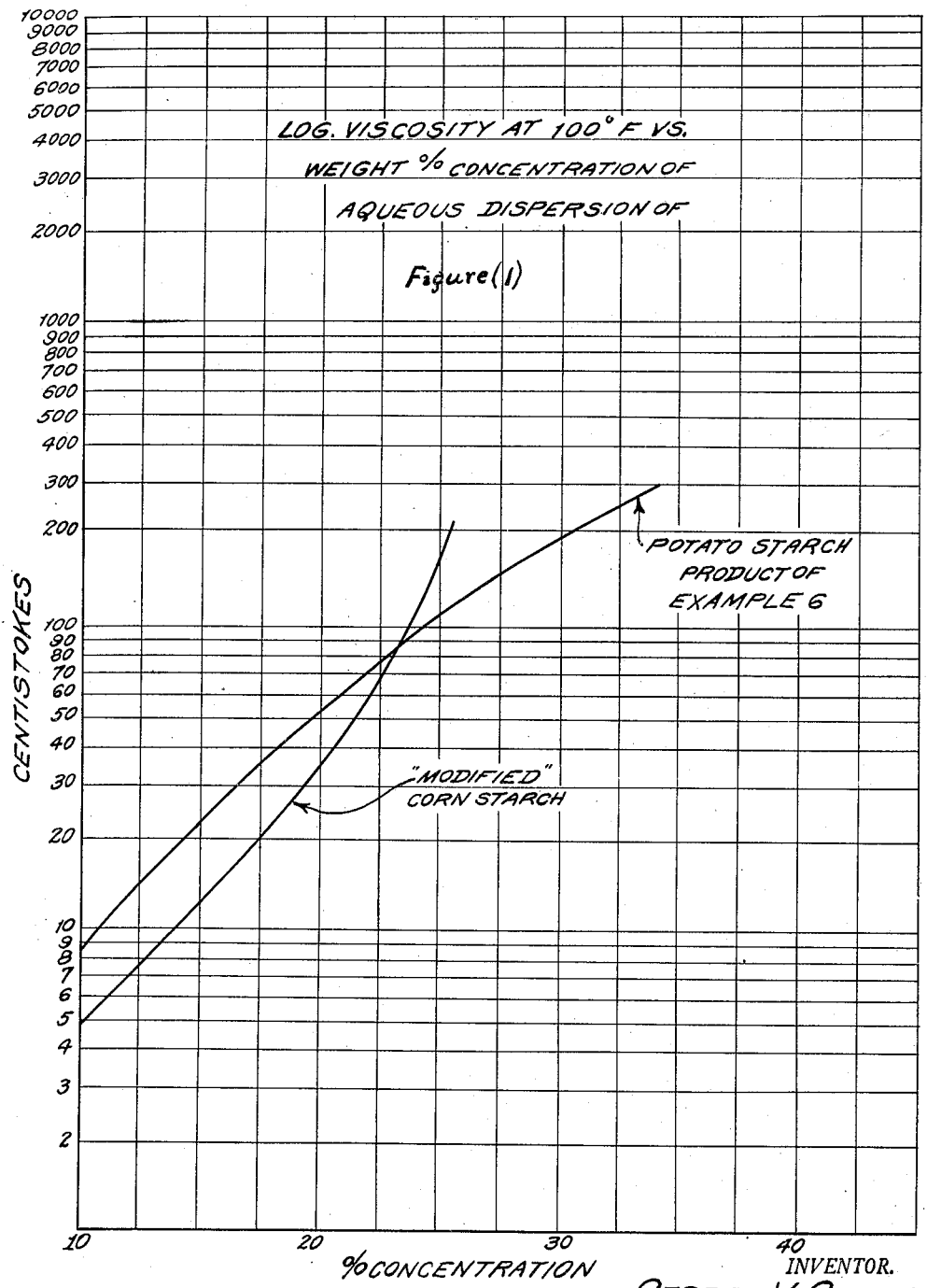

2,492,553

UNITED STATES PATENT OFFICE 2,492,553

TREATMENT OF STARCH CONTAINING FLOURS WITH CONCENTRATED ACETIC ACID IN AN INERT NONAQUEOUS DILUENT

George V. Caesar, New York, N. Y., assignor to Stein, Hall & Company, Inc., New York, N. Y., a corporation of New York Application April 27, 1946, Serial No. 665,418

7 Claims. (Cl. 106—150)

This invention relates to the conversion of starches and starch-containing flours by treatment with concentrated acetic acid in the presence of an inert non-aqueous diluent for the acetic acid, and more particularly to the conversion of such starches or flours into water dispersible products whose cooked water dispersions are substantially homogeneous, i. e., of uniform or similar chemical and physical nature throughout and do not flocculate or separate into macroscopic phases, and highly suitable as film-forming adhesives, sizing, and the like.

The objects of, and achieved by, my invention include the provision of a starch conversion process which enables the formation of water dispersible starch products adapted to form water dispersions which are homogeneous and heavy bodied, the provision of a starch conversion process adapted to the easy recovery of the unreacted acetic acid, and other objects which will be apparent as the invention is more fully developed herein.

It has now been found, and very surprisingly indeed, that if the conversion is carried out by means of concentrated acetic acid in the presence of an inert non-aqueous diluent for the acid, that is by heating a suspension of the starch flour in a single phase liquid solution of the acid in the diluent, very superior products are obtained. The aqueous dispersions of such products have a high degree of smoothness, homogeneity and viscous stability. Their viscous stability, upon aging, approaches that of the so-called thin bodied starch products.

The diluent may be so selected as to aid in the recovery of the unreacted acetic acid from the reaction mass. The process is flexible and adaptable for the formation of products which give heavy, medium or thin bodied type aqueous dispersions, for the so-called high solids or dextrine type, or low solids or starchy type dispersions. The content of fixed acetic acid or a residue thereof in the final product is in the range of 1 to 8 weight per cent.

The starches and starch-containing materials which may be treated in accordance with the invention include all readily available purified starches such as those derived from wheat, potatoes, corn, tapioca, and the like, and also the dry milled flours such as wheat, rye, and the like flours. The diluents which are suitable include dioxane, chloroform and benzene. Benzene is particularly preferred since it facilitates recovery of unreacted acetic acid. Other acetic acid solvents chemically inert to the starch may be used. From this description, one skilled in the art will be able to select a suitable diluent from the large number of available materials, without difficulty.

In order to illustrate the invention and point out some of its advantages, the following examples are included. However, these are not in any sense whatsoever to be construed as limitations upon the invention as otherwise disclosed herein.

Example 1

600 grams of 1st clear hard wheat flour was suspended in 1200 cc. of a mixture of 75 volume per cent of glacial acetic acid and 25 volume per cent of dioxane and heated with refluxing for five hours. The suspension was filtered and the precipitate oven dried to remove excess acetic acid and dioxane. The product analyzed 4.5 weight per cent of fixed acetic acid. It was suspended in water, at a concentration equivalent to 2 pounds per gallon, and cooked. The resulting dispersion was smooth, homogeneous and medium bodied.

Example 2

200 grams of rye flour was suspended in 600 cc. of a mixture composed of 75 volume per cent of glacial acetic acid and 25 volume per cent of dioxane and heated with refluxing for four hours. The reaction mass was then filtered and the precipitate oven dried to remove excess acetic acid and dioxane. The product analyzed 1.83 weight per cent fixed acetic acid. It was suspended in water at a concentration equivalent to 1 pound per gallon and cooked. The resulting dispersion was smooth, homogeneous, and medium bodied.

Example 3

200 grams of 1st clear hard wheat flour was suspended in 500 cc. of a mixture composed of 90 volume per cent glacial acetic acid and 10 volume per cent of benzene and heated with refluxing for five hours at 96° C. The reaction mass was then filtered, washed with fresh benzene to remove excess acetic acid and oven dried. The product analyzed 2.82 weight per cent of fixed acetic acid. The product was suspended in water at a concentration equivalent to 1 pound per gallon and cooked. The resulting dispersion was homogeneous, smooth, free flowing, and thin bodied.

In a duplicate run using no benzene, and heating at 97° C. for five hours, another product was obtained and similarly suspended and dispersed in water. Upon standing for 24 hours, the straight acetic acid product flocculated and became lumpy and appeared to be a semi-gel. On the other hand, the benzene product retained its homogeneity and free flowing characteristics for one week.

*Example 4*

100 grams of corn starch was suspended in 600 cc. of a mixture of 75 volume per cent of glacial acetic acid and 25 volume per cent of dioxane and heated with refluxing for five hours. The reaction mass was then filtered, and the precipitate washed with dioxane and then air dried. The product analyzed 4.35 weight per cent of fixed acetic acid. It was suspended in water at a concentration equivalent to 12 ozs. per gallon and cooked. The resulting dispersion was thin-bodied; it was clearer, more homogeneous, and showed less jelling tendencies than the heretofore available modified starches of similar hot body or viscosity. It was well adapted for warp sizing uses.

*Example 5*

200 grams of corn starch was suspended in 600 cc. of a mixture of 90 volume per cent of glacial acetic acid and 10 volume per cent of dioxane, and heated to refluxing for five hours at 113 to 114° C. The reaction mass was filtered and the precipitate oven dried. The product analyzed 5.89 weight per cent of fixed acetic acid. It was suspended in water and cooked. The resulting dispersion was exceptionally transparent, fluid and homogeneous. At a concentration of 10% solids, its kinematic viscosity at 70° F. was 185 centistokes.

*Example 6*

200 grams of potato starch was suspended in 600 cc. of a mixture of 90 volume per cent of glacial acetic acid and 10 volume per cent of dioxane and heated with refluxing for five hours. The reaction mass was filtered and the precipitate oven dried. It analyzed 4.25 weight per cent of fixed acetic acid. The product was suspended in water at a concentration equivalent to two pounds per gallon and cooked. The resulting dispersion was crystal clear and of high fluidity. At 20% solids concentrations, its viscosity at 70° F. was 173 centistokes.

*Example 7*

100 grams of corn starch was suspended in 600 cc. of a mixture of 25 volume per cent of glacial acetic acid and 75 volume per cent of chloroform and heated with refluxing for five hours. The reaction mass was filtered and the precipitate washed with chloroform. The precipitate was then dried at 65 to 75° F. It was suspended in water at a concentration equivalent to 10% by weight and cooked. The resulting product showed improved viscosity stability, that is, it showed a softer gel upon cooling to room temperature than a conventionally manufactured thin-boiling corn starch of similar fluidity in hot aqueous dispersion.

*Example 8*

333 grams of corn starch was suspended in 500 cc. of a mixture of 90 volume per cent of glacial acetic acid and 10 volume per cent of benzene and heated with refluxing for five hours at 91° C. The reaction mass was filtered and the precipitate washed with benzene and dried. The product analyzed 2.58 weight per cent of fixed acetic acid. It was suspended in water at a concentration equivalent to two pounds per gallon and cooked. The resulting dispersion was heavy bodied, exceptionally clear and homogeneous, and exceptionally stable in viscosity upon cooling and aging.

The products obtained, according to the invention, show a much higher viscous stability than starch conversion products obtained by prior art processes. Generally, the prior art conversions employ inorganic catalysts along with the acetic acid and in some cases acetic anhydride is used. The products obtained by such processes may be represented by the formula

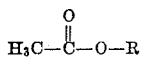

where R is a polysaccharide residue.

Although it is not intended that the invention shall be limited thereby, the following theoretical explanation is offered as an aid to a more clear understanding of the invention. It is believed that the new products obtained in accordance with the invention may be more nearly represented by the formula

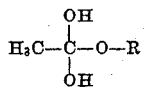

where R is as above defined.

We prefer to call the new starch acetic acid combinations or products pseudo acetates in order to distinguish them from the usual or true acetates.

Distinctions in chemical properties between a true acetate ester and the pseudo acetate product are observable experimentally. A standard method of analysis for "fixed" acetic acid in polysaccharide esters is to titrate a pyridine solution of a true acetate ester with caustic soda. If the true ester products are not first dispersed in pyridine, but instead are titrated with caustic soda alone, after digestion at 55–60° C., the fixed acetic acid values obtained are low. In the case of the "pseudo acetate" products, however, the caustic method yields a fixed acetic acid value checking within 5% or less of the value obtained by the standard pyridine-caustic method. Free or mechanically entangled acid is always present in the dried product in variable proportions. The fixed or bound acid is determined as the difference between the overall titration with caustic soda, after digestion at 55–60° C., and the titration of an aqueous slurry at room temperatures. The precision of fixed acid estimation is good for products which are substantially insoluble in water at room temperatures. For cold water soluble products, produced by prolonged digestion in acetic acid obviously no such precise distinction between fixed and free acid can be determined.

In physical properties also, new pseudo acetate products obtained in accordance with the invention differ from the usual modified starch type products. One such difference is clearly brought out in Figure 1. This is a graph of the logarithm of viscosity plotted against the concentration for aqueous dispersions of each type product. The modified starch curve is concaved upward, whereas the pseudo acetate product is concaved downward. This means that as the solids content is increased the relative increase in viscosity tends to decrease in the case of the pseudo acetate product and tends to increase in the old acetic plus mineral acid modified starch product. Thus, the new pseudo acetate products are much more adaptable for use in high solids concentration.

In view of the foregoing disclosure, variations and modifications thereof will be apparent to one skilled in the art. The invention includes all such modifications and variations as come within the scope of the appended claims.

I claim:

1. A method of preparing a water dispersible starch flour product whose cooked water dispersions are homogeneous and have downwardly concave log viscosity vs. concentration characteristics at a concentration of about 20 weight per cent solids, which comprises heating starch-containing flour in the presence of a single phase solution of an acid consisting of glacial acetic acid in a non-aqueous inert solvent at the reflux temperature of the reaction mass until the said starch has a fixed acetic acid content in the range of from about 1 to about 8 weight per cent.

2. A method of preparing a water dispersible starch flour product whose cooked water dispersions are homogeneous and have downwardly concave log viscosity vs. concentration characteristics at a concentration of about 20 weight per cent solids, which comprises heating starch-containing flour in the presence of a single phase solution of an acid consisting of glacial acetic acid in dioxane at the reflux temperature of the reaction mass until the said starch has a fixed acetic acid content in the range of from about 1 to about 8 weight per cent.

3. A method of preparing a water dispersible starch flour product whose cooked water dispersions are homogeneous and have downwardly concave log viscosity vs. concentration characteristics at a concentration of about 20 weight per cent solids, which comprises heating starch-containing flour in the presence of a single phase solution of an acid consisting of glacial acetic acid in benzene at the reflux temperature of the reaction mass until the said starch has a fixed acetic acid content in the range of from about 1 to about 8 weight per cent.

4. A method of preparing a water dispersible starch flour product whose cooked water dispersions are homogeneous and have downwardly concave log viscosity vs. concentration characteristics at a concentration of about 20 weight per cent solids, which comprises heating starch-containing flour in the presence of a single phase solution of an acid consisting of glacial acetic acid in chloroform at the reflux temperature of the reaction mass until the said starch has a fixed acetic acid content in the range of from about 1 to about 8 weight per cent.

5. A method of preparing a water dispersible starch flour product whose cooked water dispersions are homogeneous and have downwardly concave log viscosity vs. concentration characteristics at a concentration of about 20 weight per cent solids, which comprises heating proteinaceous starch-containing flour in the presence of a single phase solution of an acid consisting of glacial acetic acid in benzene at the reflux temperature of the reaction mass until the said starch has a fixed acetic acid content in the range of from about 1 to about 8 weight per cent.

6. A method of preparing a water dispersible starch flour product whose cooked water dispersions are homogeneous and have downwardly concave log viscosity vs. concentration characteristics at a concentration of about 20 weight per cent solids, which comprises heating proteinaceous starch-containing flour in the presence of a single phase solution of an acid consisting of glacial acetic acid in dioxane at the reflux temperature of the reaction mass until the said starch has a fixed acetic acid content in the range of from about 1 to about 8 weight per cent.

7. A method of preparing a water dispersible starch flour product whose cooked water dispersions are homogeneous and have downwardly concave log viscosity vs. concentration characteristics at a concentration of about 20 weight per cent solids, which comprises heating proteinaceous starch-containing flour in the presence of a single phase solution of an acid consisting of glacial acetic acid in chloroform at the reflux temperature of the reaction mass until the said starch has a fixed acetic acid content in the range of from about 1 to about 8 weight per cent.

GEORGE V. CAESAR.

REFERENCES CITED

The following references are of record in the file of this patent:

UNITED STATES PATENTS

| Number | Name | Date |
| --- | --- | --- |
| Re. 21,291 | Cantor | Dec. 12, 1939 |
| 71,174 | Hover | Nov. 19, 1867 |
| 168,435 | Wattles | Oct. 5, 1875 |
| 278,681 | Campbell | June 5, 1883 |
| 941,159 | Militz | Nov. 23, 1909 |
| 1,578,960 | Davis | Mar. 30, 1926 |
| 2,362,282 | Lindsay | Nov. 7, 1944 |
| 2,392,359 | Borglin | Jan. 8, 1946 |
| 2,405,973 | Nichols et al. | Aug. 20, 1946 |

FOREIGN PATENTS

| Number | Country | Date |
| --- | --- | --- |
| 487,020 | Great Britain | June 14, 1938 |